United States Patent [19]

Lahr

[11] Patent Number: 4,737,645
[45] Date of Patent: Apr. 12, 1988

[54] PRINTER SUPPLIES MONITORING SYSTEM

[75] Inventor: Roy J. Lahr, Los Angeles, Calif.

[73] Assignee: Creative Associates Limited Partnership, Los Angeles, Calif.

[21] Appl. No.: 849,673

[22] Filed: Apr. 9, 1986

Related U.S. Application Data

[60] Division of Ser. No. 794,951, Nov. 1, 1985, which is a continuation of Ser. No. 570,744, Jan. 16, 1984, abandoned.

[51] Int. Cl.$^4$ .................... G01N 21/64; G01J 3/30; B41J 29/18
[52] U.S. Cl. ............................ 250/458.1; 250/461.1; 356/317; 400/708
[58] Field of Search .................. 250/458.1, 461.1; 356/317; 400/708

[56] References Cited

U.S. PATENT DOCUMENTS 2,567,049  9/1951  Belluche ........................... 250/461.1
3,105,908  10/1963  Burkhardt et al. ............... 250/461.1

Primary Examiner—Janice A. Howell
Attorney, Agent, or Firm—Kenyon & Kenyon

[57] ABSTRACT

A printer of the type used with typewriters and computerized equipment is provided with a system for monitoring the supply of printable media, such as paper. A first thickness measuring caliber is used to measure the thickness of the paper to be printed, and a second such caliber measures the thickness of a supply stack stored in a bin. With such information, the approximate number of sheets remaining in the stack can be determined, and the decision whether a sufficient paper supply is available to complete a printing job can be made. One or both such calibers may utilize an electrical component, such as a potentiometer, for providing an electrically measurable parameter responsive to the thickness being measured. The sheet thickness measurement signal can be used to control a motorized arrangement which controls the throat opening of the printer. In addition, this signal can be used to select one of several available platen surfaces of different hardnesses. Once the printable media has been installed on the printer, an optical sensor system responsive to a predetermined wavelength of light emitted by a light converter layer locates the edge of the printable media.

6 Claims, 8 Drawing Sheets

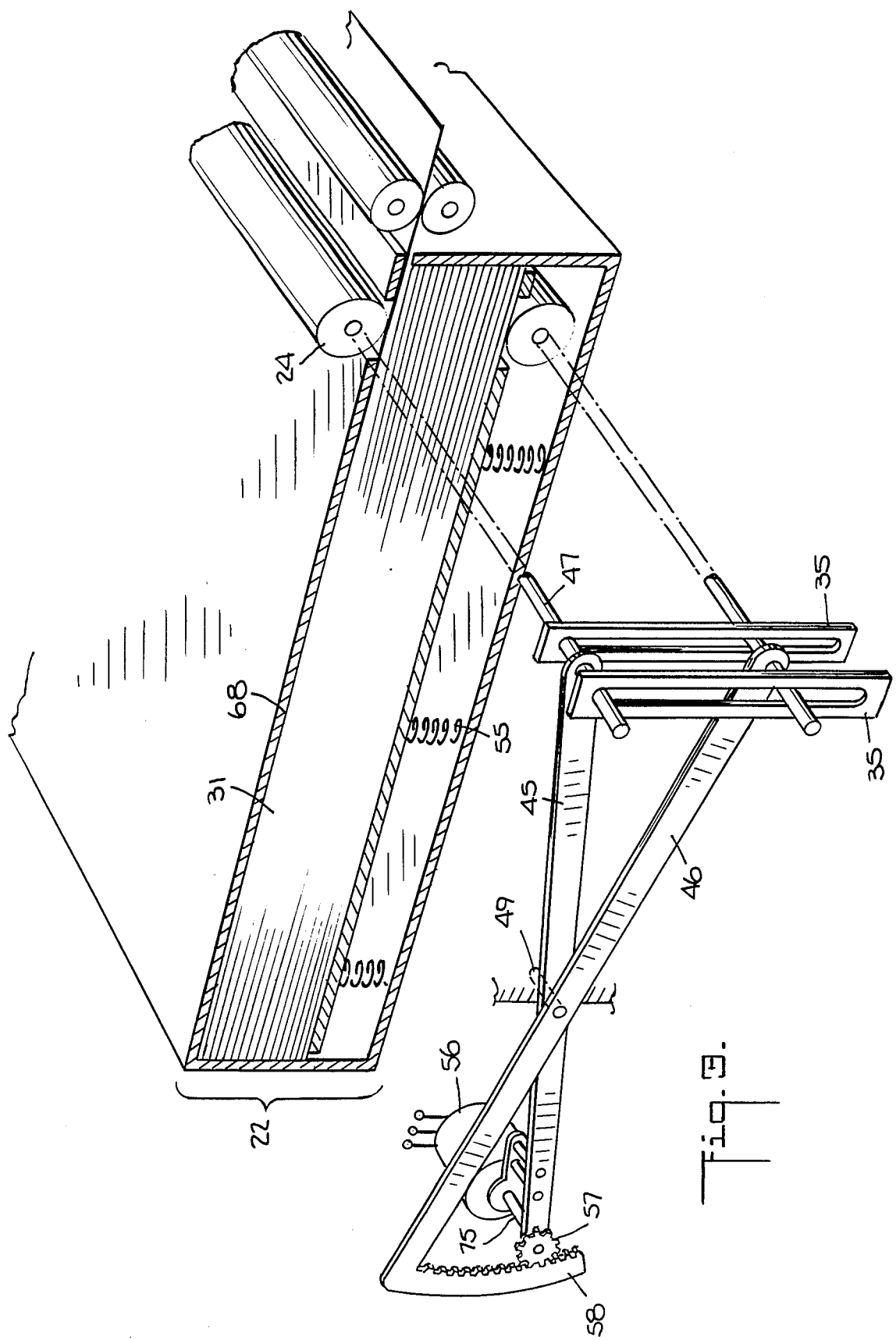

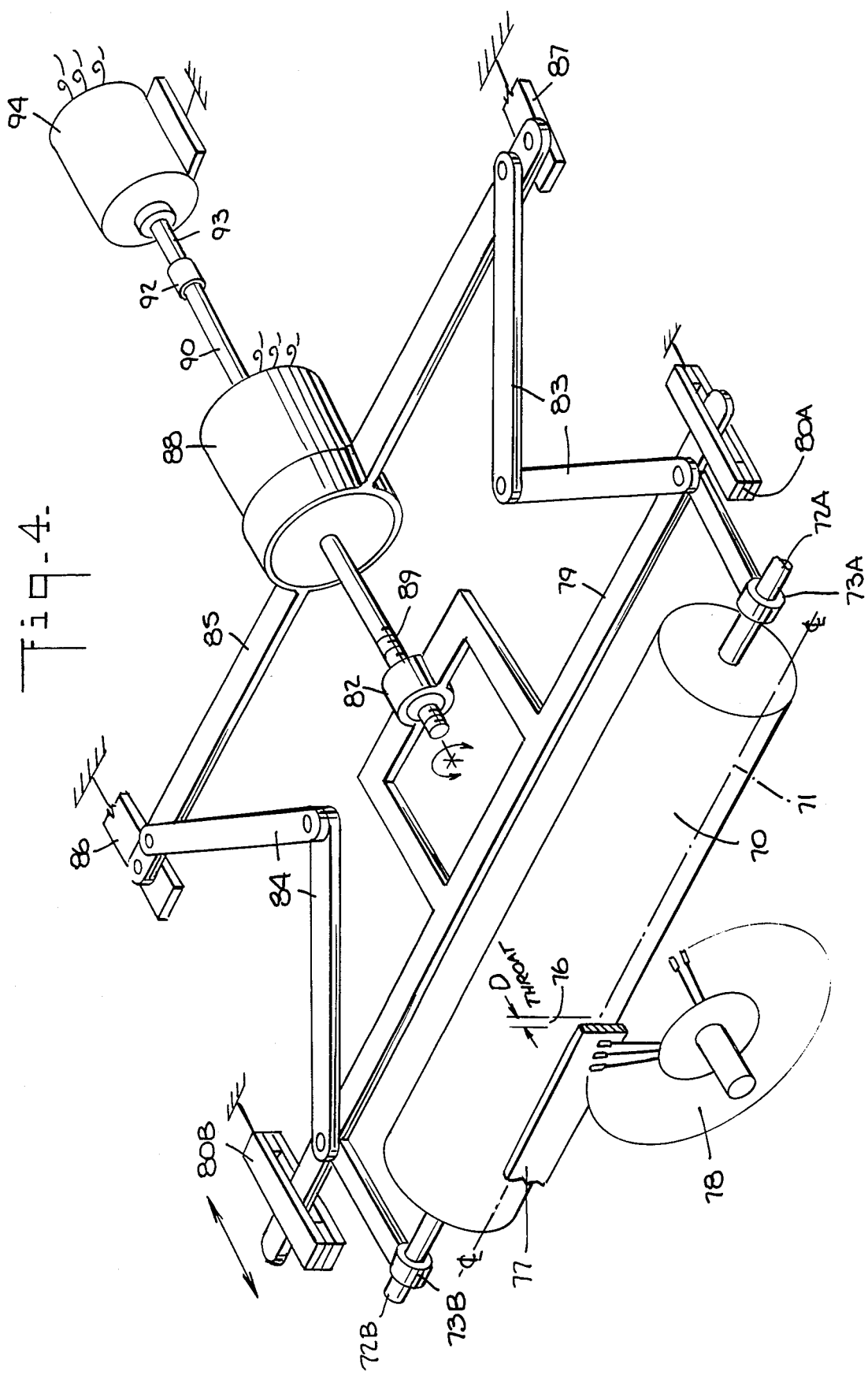

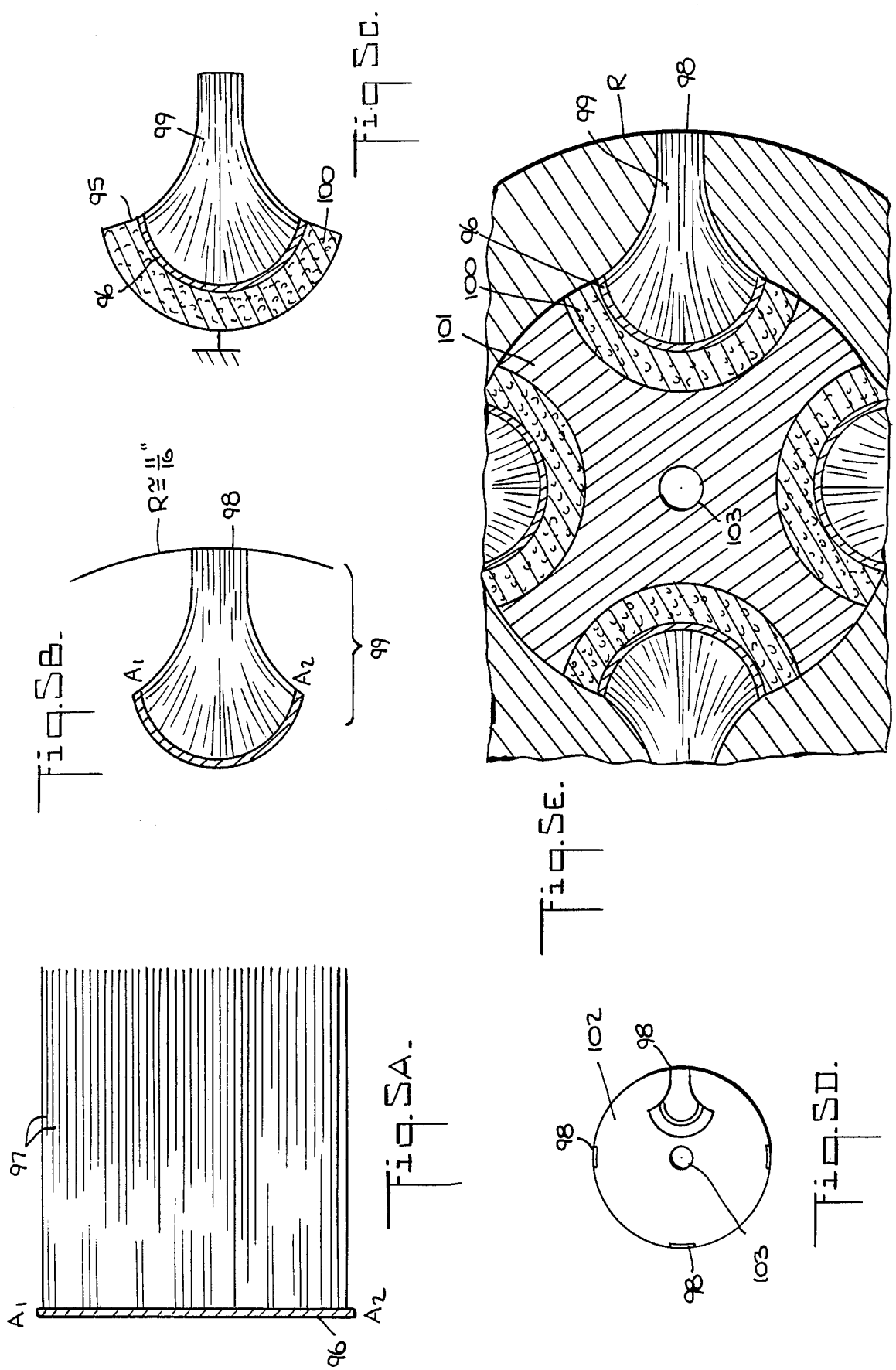

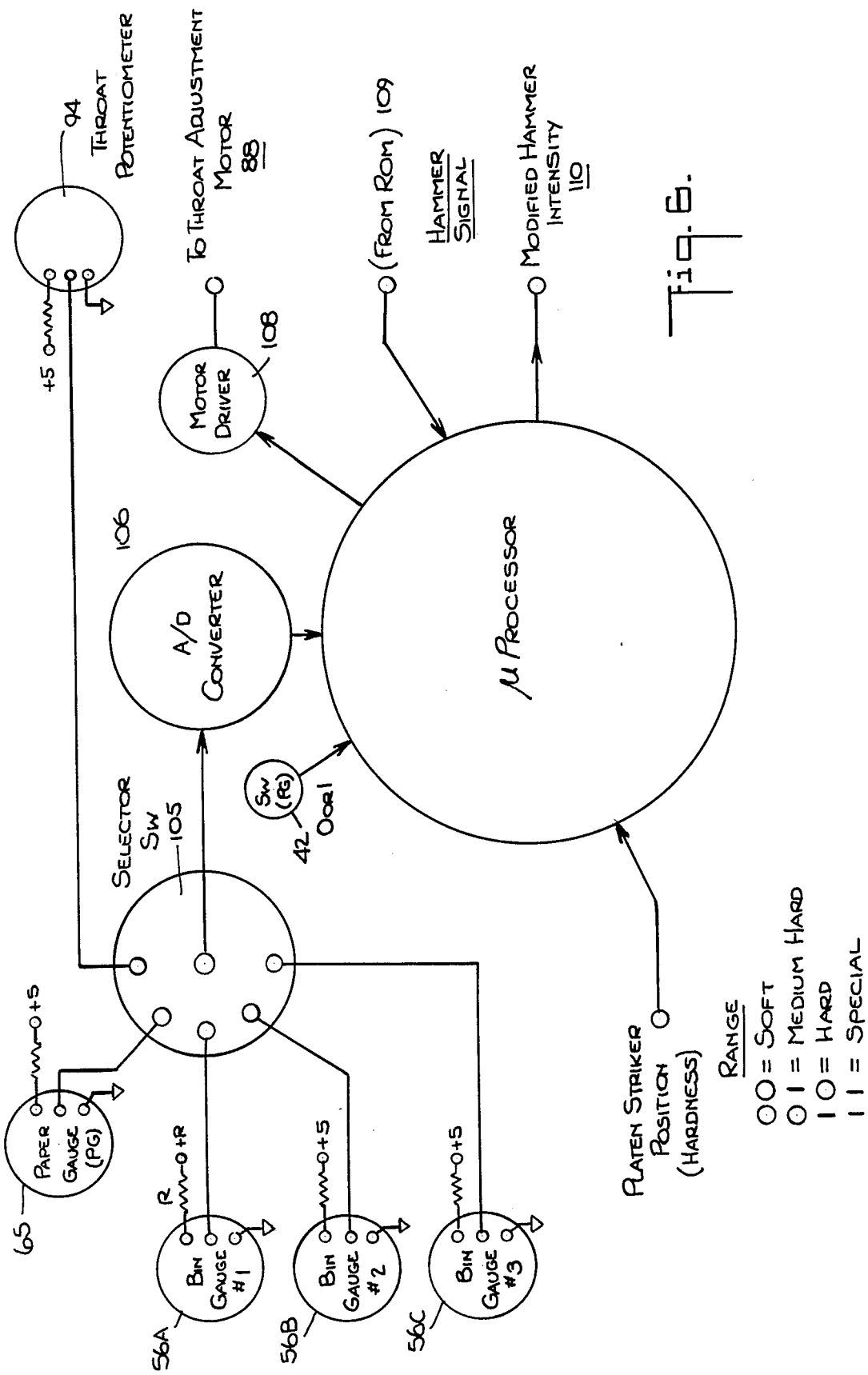

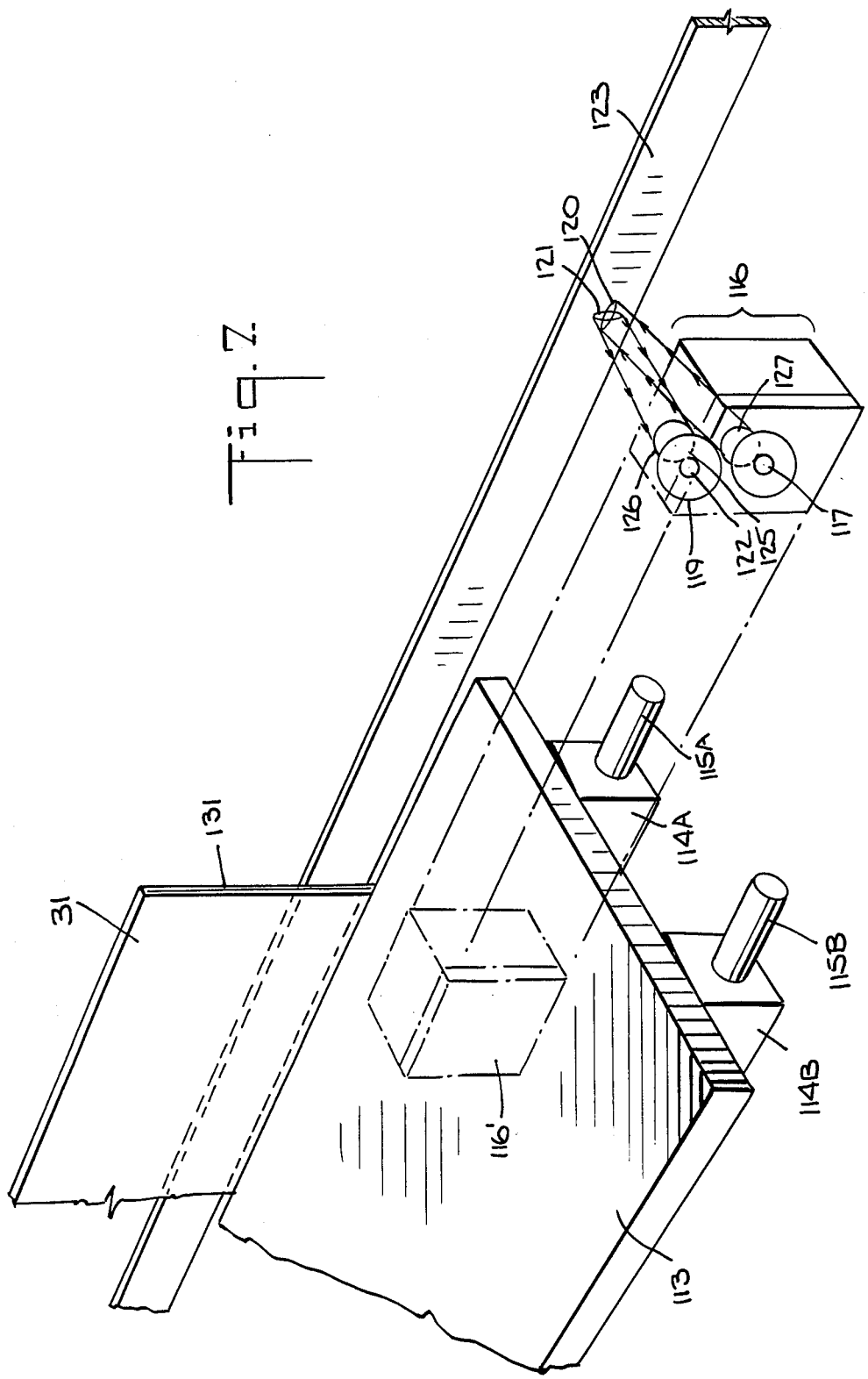

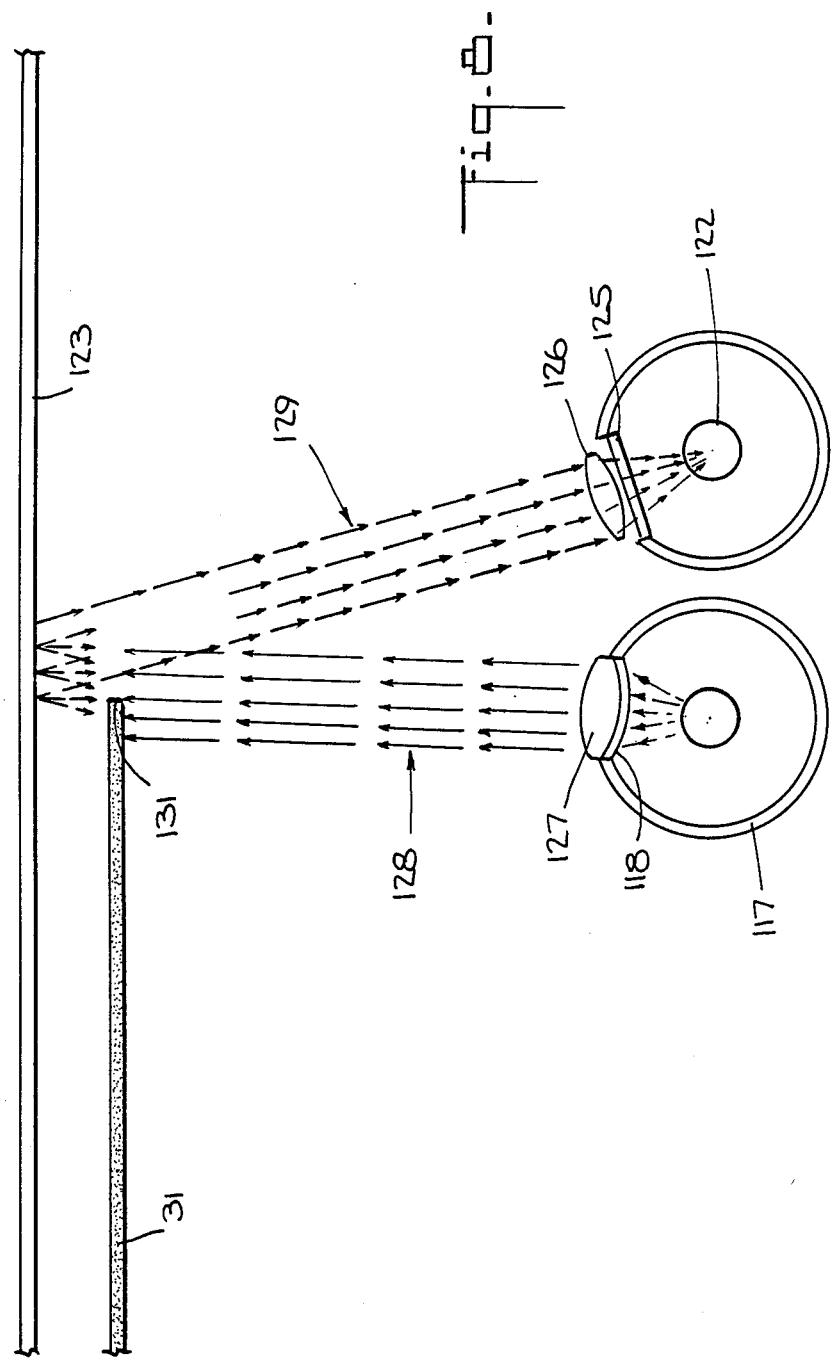

PRINTER SUPPLIES MONITORING SYSTEM

This is a division of application Ser. No. 794,951 filed Nov. 1, 1985, which in turn is a continuation of application Ser. No. 570,744, filed 1/16/84, now abandoned.

RELATIONSHIP TO OTHER APPLICATIONS

This disclosure is related to, and incorporates by reference, the following applications:
Rotary Printer With Off-Carriage Motor Drive, Ser. No. 570,737, filed 1/16/84.
Shift System for Multi-Row Print Element Ser. No. 570,739, filed 1/16/84.
System for Using Multiple Print Heads in Single Printer, Ser. No. 570,732 filed 1/16/84.
Paper Transport System for Printer, Ser. No. 570,738, filed 1/16/84.
Changer Arrangement for Information-Bearing Elements, Ser. No. 570,745, filed 1/16/84.
Ribbon Indicia System, Ser. No. 570,734, filed 1/16/84.
Vacuum Buffered Ribbon Transport System, Ser. No. 570,913, filed 1/16/84.
High Capacity Ribbon Supply Arrangement, Ser. No. 570,746, filed 1/16/84.
Splittable Keyboard for Word Processing, Typing and Other Information Input Systems, Ser. No. 570,747, filed 1/16/84.
Rotary Print Element, Components Thereof and Drive Coupling Apparatus Therefor, Ser. No. 570,733, filed 1/16/84.

BACKGROUND OF THE INVENTION

This invention relates generally to printers, typewriters and other image-placing equipment which utilize precut sheets, illustratively of paper, as the image receiving medium, and more particularly to printers in which the characters are formed serially.

As offices and individuals increasingly operate computer-based equipment from remote locations, including printers for producing hard copy on paper for later inspection, there is a corresponding need to exchange information and files and to share equipment. Wired networks are often provided for permitting communication between several users so that they may share information and input/output facilities. However, in situations where a hard copy output device, such as a printer, is operated by a remote user, overall system reliability can be severely degraded by a lack of a human attendant at the printer site. This is particularly true where the printer is designed to be operated primarily under the supervision of a local operator who can monitor the equipment. It is, however, inefficient to station an operator at equipment which only intermittently needs attention, especially since it is practically impossible to predict exactly when such equipment will require a human attendant.

It is a known problem that remote printer equipment often needs attention, but the need for such attention is unpredictable and difficult to schedule. The present art includes automatic cut sheets feeders, but only local inspection can determine the size of the paper in the automatic feeder, and whether the number of sheets of that size paper, in stock in the feeder is likely to satisfy the remote order to print out Q sets of R pages. Oftentimes, a remote attendant or operator can schedule a smaller existing job to consume the available paper supply and plan to visit and reload the feeder input hopper before the large job is printed.

In addition, there are several printer adjustment tasks that optimize printing on a given type of paper and such printer adjustments cannot be performed conveniently without leaving the user's normal workstation and visiting the site of the printer. With a serial impact printer, illustratively a disc printer, in which the character to be printed is mounted at the periphery of one of approximately one hundred spokes connected to a common circular hub, a hammer is electrically signaled to engage the rear of the character-bearing pad and urge the pad into a ribbon so that the ink layer atop the ribbon assumes the shape of the desired character and is then impressed onto the paper to form the visible character mark. To secure a character image with high density, sharp edge definition, and unbroken dark area fill between the edge boundaries may require that the printer be adjusted precisely for the particular paper being used.

The throat opening of a printer is a zone located between the ribbon and the paper-holding platen. This throat opening distance must be adjusted so that it is just greater than the paper thickness. Hammer impact energy is varied, usually on the basis of character size and/or paper thickness information, and the distance between the rest position of the hammer to its probable impact point.

It is a further problem that multiple paper sets or very thick paper will absorb more energy than thin paper. There is therefore a need for a strike-receiving member, such as an impact bar or platen, with the capability of selectable resiliency and/or hardness for optimizing the clarity of print on a variety of paper thicknesses. Multi-part sets using microencapsulated ink which prints on all pages after the first in a set are known, and require substantial printing parameter changes. The prior art has thrust at this problem in manual typewriters by making the whole platen roll interchangeable, using a medium durometer hardness rubber platen roll for 20 to 30 pound basis weight paper, and a brass platen for use in printing on 60 pound basis weight paper, such as library cards and the like.

The determination of the location of the edge of the paper stock which has been fed into the printing zone is at least as important as the aforementioned printing parameters. When paper is automatically fed into a printer, it is usually necessary to ensure that the left edge of the paper is aligned vertically so that the printing lines are substantially horizontal. A multiplicity of optical or mechanical sensors are known in the art, such as a method whereby an illuminator source and detector are mounted on the laterally moving print carriage. However, in systems where the edge is sensed by comparing the paper reflectance against a provided background, the use of a light-absorptive or dark paper stock may confuse the edge measurement detector when the comparison is perfomed against a dark background. It is preferable to use an edge detection system that does not contact or damage the paper, and this is a significant advantage of an all-optical system. Accordingly, there is a need for an optical edge location system which is reliable when working with dark paper stock.

It is important to determine the location of the left paper edge, so that the internal margin control can reconstruct a desired margin width after vertical realignment of paper thereof. Such realignment is generally likely to shift the paper laterally on the platen wlth respect to its original position. Thus, after vertical alignment, it is possible dynamically to relocate the actual printing margins according to edge location measurement, assuming that the paper edge can be accurately located.

It is, therefore, an object of this invention to provide a printer with an edge location measurement system which is markedly less sensitive to paper color and absorptivity than previous visible light reflectance systems.

It is another object of this invention to provide a printer with a gauging system with which paper supply quantity can be measured; the results of this measurement being transmitted to a remote location so that a user at that location can control printing without visiting the printer site.

It is a further object of this invention to use the gauging system-derived value of paper stock thickness so that the printer throat distance can be automatically adjusted for optimum printing distance.

It is still another object of this invention to use the gauging system-derived value of paper stock thickness so that hammer parameters can be reset for optimum print quality.

It is yet another object of this invention to use the gauging system-derived value of paper stock thickness so that the effective platen hardness may be altered to achieve optimum printing.

SUMMARY OF THE INVENTION

The foregoing and other objects are achieved by this invention which provides a supplies monitoring system for a printer. The system is provided with a thickness measuring guage which provides a signal corresponding to the thickness of the paper or material which is desired to be printed. In addition, since the paper or material to be printed upon is maintained in a stack, pile, or roll in a storage area such as a bin from which the sheets to be printed upon are drawn from by a page imaging device such as a printer, there is further provided a stack thickness measuring gauge which measures the thickness of the stack and produces a corresponding signal. With such information pertaining to the sheet and stack thickness, the number of sheets remaining in the stack can be determined. Of course, such a system can be utilized to determine the number of remaining envelopes in a stack, notwithstanding that the envelopes are formed of more than one layer of sheet material.

In accordance with a further aspect of the invention, the information pertaining to the thickness of the sheet material or envelope to be printed upon is utilized to control mechanism which varies a throat opening of the printer. As indicated, the throat opening corresponds to a distance between the ribbon and the platen and should correspond closely to the thickness of the paper being printed upon. An information processing system is provided to control the throat opening in response to the measured thickness value.

In accordance with a still further object of the invention, the platen of the printer is arranged to provide a plurality of printing surfaces of respective hardnesses. In a further embodiment, each such printing surface is formed at the end surface of a plurality of condensed fibers. The fibers are attached at their opposite ends to a fiber backing in the form of the pile of an ordinary carpet. In addition, an elastomeric material having a predetermined durometer characteristic is provided to absorb mechanical impact loads which are transmitted from the printed surface on one end of the fibers to the pile backing, through the fibers.

In a preferred embodiment of the invention, the gauging station where the paper thickness is measured is in the form of a manually-controlled clamp. For convenience, the gauging station is located near the paper storage loading area or near the normal seating location of an operator or attendant. In each bin, a bulk gauging arrangement provides a measurement of the aggregate thickness of the stack of paper stock therein. Usually, dividing the bulk gauge value of bin stock thickness by the individual sheet thickness will provide a sufficiently accurate estimate of remaining sheet quantity. However, such aggregate bulk counting may not be sufficiently accurate for sheet or envelope stock because the surface contour is not completely flat, as in some of the uncalendared or very rough screen-finished stock which is popular for personalized stationery. For these varying contour materials, it is oftentimes advisable to count the sheets in a stack manually, and then to use this count to preset a calibration factor into the stack gauging system. For a given stack compression force, the calibration factor will remain substantially constant. If the gauging system is constructed using electronics so that the paper stock thickness and the bin cumulative stack thickness is converted into electrical signals, and this analog value is transformed into digital values, such as by an analog-to-digital electronic logic converter circuit, the values can be processed by a microprocessor. Microprocessors are commonly available in modern printing terminals and provide the advantage that once the value of the paper stock count is available in the microporcessor, such value may be transmitted to a remote user, to determine whether the needed stock quantity for a particular printout requirement is available.

A second novel use for a digital value corresponding to a paper stock thickness is that of setting platen-ribbon throat distance. This embodiment uses a mechanically-operated throat distance adjustment arrangement which provides an analog feedback and monitoring signal. The analog signal is converted to a digital format and delivered to a microprocessor which controls the movement of the platen so that the value of the throat distance corresponds to a desired value which is responsive to the paper stock thickness. In a preferred embodiment, an electric motor which may be connected to receive power from the microprocessor via a buffer amplifier causes the platen motion with respect to the ribbon. The motor shaft rotates a multi-turn potentiometer which functions as a positional feedback device.

The digital value of the paper stock thickness is also useful for setting a hammer impact strength parameter. A person of skill in the art is afforded a choice between either mechanically setting a hammer strike distance with respect to a forcing anvil, so as to control impact intensity, or using the paper thickness value to offset an electrical hammer drive signal from a particular average intensity value which is assigned to a particular character. This average intensity value will be assigned during character design by the supplier or manufacturer; the hammer drive value being responsive to the area of the character and the width system. The width system may be one of several proportional character widths, or may be one of the three standard widths, based on printing selectably at 10, 12, or 15 characters per inch. The assigned nominal hammer drive intensity value assumes a medium platen hardness and a single-sheet paper stock of about 20 point basis weight. With the paper thickness data available, this typical hammer drive intensity setting may be modified in response to the characteristics of the paper sheet. It can be expected that the resulting modification would be toward a lesser intensity if the paper stock were to be very light, such as 16 pound basis weight onion skin, or would be modified upwards to higher hammer drive intensity values, if the paper stock were to be relatively heavy, such as 45 pound basis weight ledger stock or multipart forms sets.

In accordance with a further aspect of the invention, the digital value corresponding to the paper thickness can be used to select an appropriate platen hardness. Once the paper thickness is known, the impact reception characteristic of the platen or other impact strike receiver may be altered either from general paper characteristics or manually set calibration data. As discussed hereinbefore, the present art replaces the entire platen when using heavy card stock, substituting a brass platen for the more usual medium-hard rubber platen.

In one embodiment of the invention, a plurality of platen strike bars having respective hardnesses replace a single-hardness platen. Each strike bar is constructed to provide a proper, impact-absorbing backing for a particular range of paper stock thicknesses. In one embodiment, four strike bar sectors might be provided, illustratively one for light weight paper stock, with a basis weight range of 15-19 pounds, two strike bars for medium weight paper stock with a basis weight of 20-30 pounds, and one for heavy weight paper stock with a basis weight of 31 pounds and greater. Two strike bars are thus provided on the platen for the most common "bond paper" range, 20-30 pound stock since the striker bar for this basis weight paper stock could either wear or take an inelastic set deformation more quickly. It is possible to provide a separate sector for very heavy stock, on the order of 45-60 pound basis weight stock, but since the usual platen diameter of 1⅜ to 1½ inches forces a very tight radius upon such heavy stock, such heavy stock is usually handled only manually in flat front-feed stations. Most automatic feeders can transport 50-70 pound stock only if the printing path allows the material to remain essentially flat. Thus, a suggested basis weight range for the striker bars of 15 to 40 pounds is practical for typewriters and office printers.

In arrangements which use a cylindrical platen, a multi-hardness striker bar ensemble is fashioned into a platen-shaped replacement unit. Alternatively, automatic paper handling printers which do not use a conventional cylindrical platen may have the strike bar shaped to allow the placement of vacuum ports immediately adjacent to the striking surface and other auxiliary paper handling units, such as tractor belts or wheels.

Although the multiple hardness striker bar of the present invention is somewhat more expensive than the conventional platen or single hardness striker bar which it replaces, the gain in print quality is noticeable, particularly on paper stock well outside the usual weight range, such as very heavy letterhead envelope stock. Thus, when the paper thickness gauge signals the paper monitoring system that lighter or heavier paper stock than the usual 20-24 pound bond is to be used, substantially all of the impact energy parameters that affect print quality can be automatically readjusted for achieving optimum print quality.

In addition to monitoring the thickness of paper stock or multipart stock forms, it is important to determine the location and position of the paper stock. This is achieved by edge position detection which can be used for achieving vertical alignment of the paperstock, or for determining the actual edge position after such vertical alignment wherein the actual side edges may drift laterally during top edge horizontal alignment adjustments. The finding of the paper edge accurately allows automatic resetting of the margin position to track the newly found edge.

BRIEF DESCRIPTION OF THE DRAWINGS

Comprehension of the invention is facilitated by reading the following detailed description in conjunction with the annexed drawings, in which:

FIG. 3 is an isometric representation of a paper stock quantity measurement system for use in each paper bin or tray;

FIG. 4 is an isometric representation of a printer throat distance adjustment mechanism;

FIGS. 5A-5E show structural details of a multiple hardness striker bar assembly;

FIG. 6 is a simplified function diagram of a microprocessor-controlled paper thickness monitoring system;

FIG. 7 is a simplified isometric representation of a paper edge location measurement system; and FIG. 8 is a schematic diagram illustrating the operation of the optical sensor in the paper edge location measurement system of FIG. 7.

DETAILED DESCRIPTION

Figure 1:
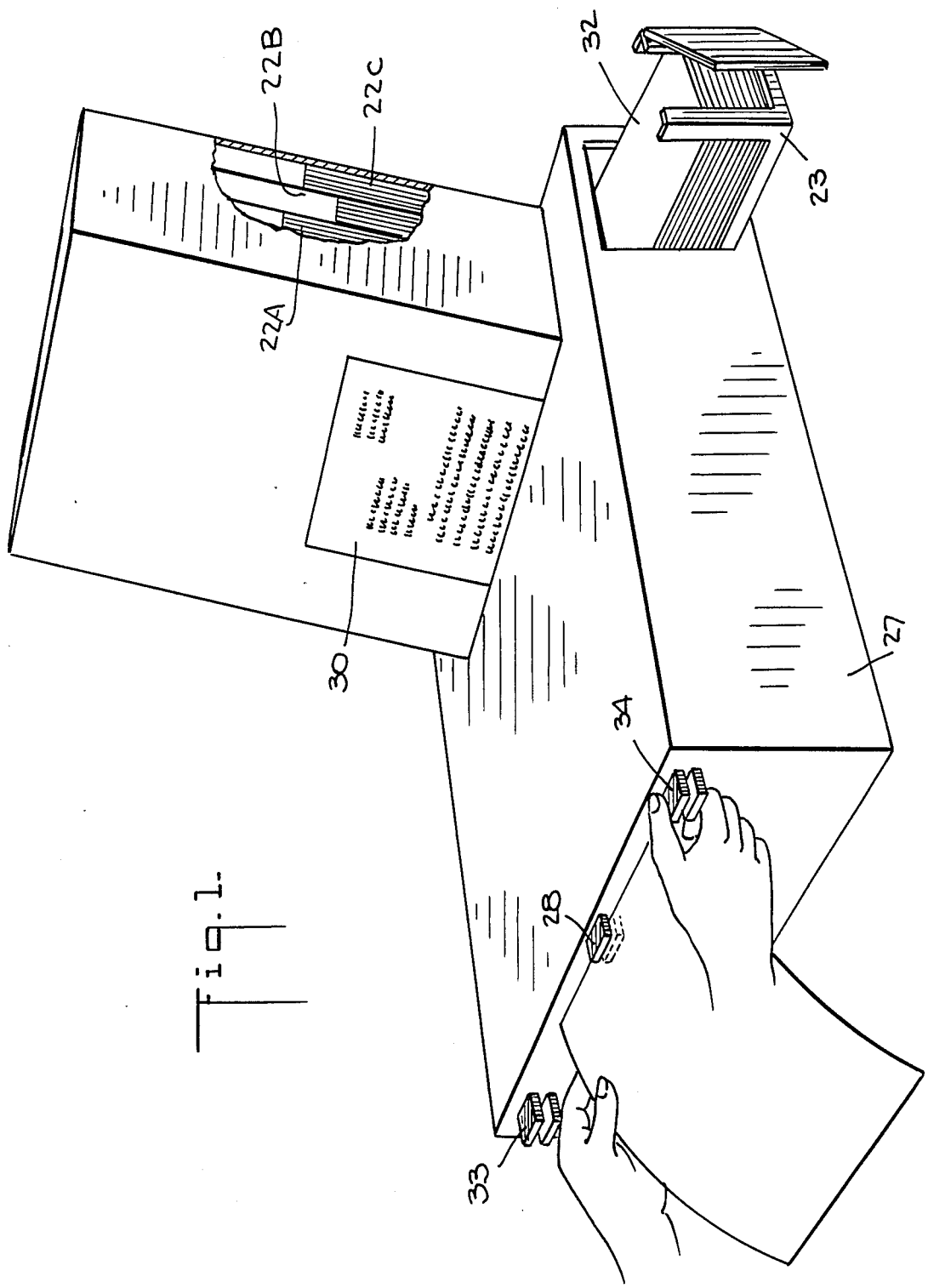
FIG. 1 is a simplified representation of a printer case showing paper stock thickness measurement and paper stock storage locations.

FIG. 1 is a simplified perspective representation of a case for a printer wherein a thickness measurement system has been installed to facilitate measurement of the various supply paper stocks. As shown, the specific illustrative embodiment is provided with a central paper gauge jaw pair 28, which is opened for insertion of a paper sheet 31 therebetween. In this embodiment, paper gauge jaw pair 28 is opened by squeezing together one or both of a left and a right gauge jaw opener, 33 and 34, respectively. An illustrative mechanism with which the paper gauge jaw pair 28 is opened, and the measurement taken, is described hereinbelow with respect to FIG. 2.

Once the paper stock has been measured, a representative paper sheet 31 placed in an appropriate one of three sheet bins 22A, 22B and 22C, which are shown as being located behind a page 30 which is being printed. If the paper stock being measured where an envelope, such as, envelopes 32, the envelope would be placed in an envelope bin drawer 23 located in the lower rear portion of the printer.

Figure 2:
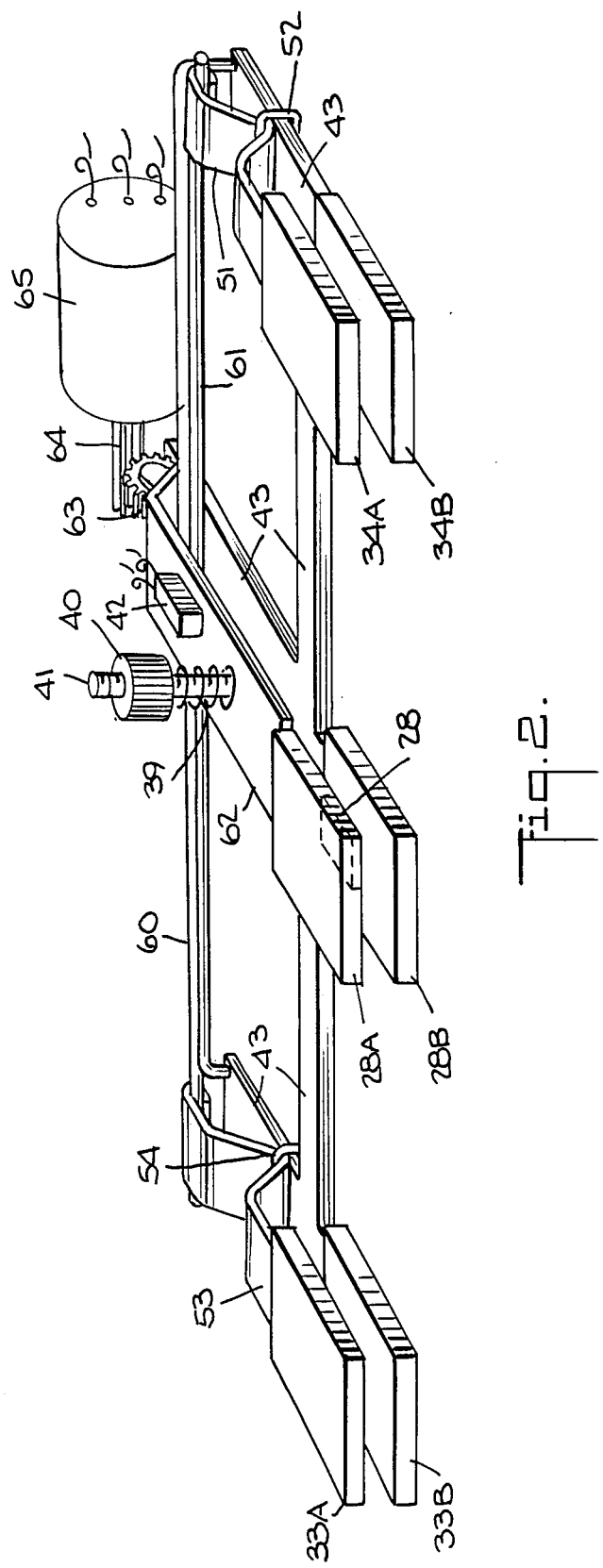
FIG. 2 is a simplified isometric representation of the paper stock thickness mechanism.

FIG. 2 is a simplified isometric representation of an illustrative mechanism with which paper gauge jaw pair 28 performs its measurement function. Paper gauge jaw pair 28 is shown in this figure as being formed of an upper jaw 28A and a lower jaw 28B. A similar referencing system is utilized in designating the left and right gauge jaw openers 33 and 34 with upper opener members 33A and 34A, and lower opener members 33B, and 34B, respectively. As noted hereinabove, the squeezing together of either of either gauge jaw opener pairs opens the paper gauge jaws to permit insertion of paper stock, illustratively in sheet or envelope form.

If left paper gauge jaw opener 33 were to be operated by the squeezing together of opener members 33A and 33B, the depression of opener member 33A toward opener member 33B would cause the forward portion of a left pivot tab 53 to move downwardly, thereby forcing the rearward portion of left pivot tab 53, which holds the end of a left operator bar 60, upward. Since the other end of left operator bar 60 is coupled to a gauge frame base 43, the center of left operator bar 60 is moved upward approximately one half of the distance which of the rearward portion of left pivot tab 53 moves upwardly. This forces a gauge pivot tab 62 upward, and thereby opens paper gauge jaws 28A and 28B. Both, a left pivot tab 53 and a right pivot tab 51, are held in respective notches in gauge base 43 by respective clip wires, in the form of left and right pivot tabs retainers 54 and 52, respectively. The use of separate operator bars, such as left operator bar 60, or a right operator bar 61, allows independent use of either paper gauge jaw opener on either of the left and right sides. When the jaw opener which has been actuated is released after insertion of paper sheet 31 between paper gauge jaws 28, a gauge pressure spring 39 urges paper gauge jaws 28A and 28B toward one another. Spring pressure is regulated by rotating a gauge pressure adjustment spring nut 40 mounted on a gauge pressure spring screw of 41. The spring pressure places an impression bar 38, which is located on the underside of paper gauge jaw 28A, into communication with the paper sheet which is held by the flat upper side of lower paper gauge jaw 28B.

In one illustrative embodiment, the impression bar is demensioned to be approximately 0.080 inches wide, by 0.120 inches long, and 0.050 inches thick. Thus, the paper thickness is determined by use of a measuring surface which approximates that of a full character zone, but which is not so small as to cause a disfiguring dent in the soft paper during measurement. The actual measurement occurs when gauge pivot tabs 62 are moved, rotating a gauge tab sector gear 63 against a potentiometer pinion gear 64, by causing a ten-turn paper gauge potentiometer 65 to assume values corresponding to the distance by which paper jaws 28A and 28B are separated. Since measurement should not be performed when the paper gauge jaws are opened for insertion of the paper, a gauge switch 42 which is located above gauge pivot tab 62 opens when the paper gauge jaws 28 are opened beyond the desired measuring range, such as that representing, illustratively 70 pounds of basis weight paper, having a thickness of approximately 0.014 inches. When the paper stock is not present between paper gauge jaws 28, the paper gauge potentiometer will read a value representing zero. Since wear and deformation of gauge pivot tab 62 or other parts could cause drift of the zero position, it is important that the zero reference value be taken before or after the paper stock is measured to ensure the accuracy of the measurement.

FIG. 3 is a simplified isometric view of a schematic representation of a paper stack height gauging system which is suitable for determining the quantity of paper supply in a sheet bin. A stack of sheet paper 31 is placed in one of sheet bins 22A, 22B, and 22C, such that a set of bin paper lift springs 55 urge a floating base 29 to compress the stack of sheet paper 31 against a bin top 68. An upper gauge roller 24 protrudes sufficiently to touch firmly the top sheet of paper. A lower gauge roller 25 is similarly mounted in a slot in storage bin floating base 29 such that the upper edge of lower gauge roller 25 touches the underside of the lowermost sheet of paper in the stack. An upper roller shaft 47 is attached to upper gauge roller 24, and a lower roller shaft 48 is attached to lower gauge roller 25.

A bin gauge upper arm 45 and a bin gauge lower arm 46 are coupled by a frame-mounted arm pivot 49. The rightmost ends of bin gauge upper arm 45 and bin gauge lower arm 46 are provided with holes such that upper roller shaft 47 and lower roller shaft 48 can pass therethrough. A pair of roller shaft guide plates 35, each having an elongated opening are positioned on either side of bin gauge arms 45 and 46. The left end of bin gauge lower arm 46 is formed so as to be provided with a gauge sector gear 58. Gauge sector gear 58 engages a pinion gear 57 which is attached to the left portion of bin gauge upper arm 45. A pinion gear shaft 75 passes through a hole in bin gauge upper arm 45, and gauge pinion gear 57 is pivotally affixed thereto. Thus, when the vertical distance between upper gauge roller 24 and lower gauge roller 25 is changer, gauge pinion gear 57 rotates on gauge sector gear 58. A multi-turn readout potentiometer 56 is mounted on bin gauge upper arm 45 and has an operating shaft connected to pinion gear shaft 75. Thus, when gauge pinion gear 57 rotates, multi-turn readout potentiometer 56 will deliver new electrical data corresponding to that rotation. An electrical parameter, in this case resistance, is thus varied to a value responsive to the distance between upper gauge roller 24 and lower gauge roller 25. Arithmetic circuitry (not shown) divides the distance value by the page thickness value derived from the operation shown in FIG. 2 to arrive at a value corresponding substantially to the total number of pages contained between the upper and lower gauge rollers.

In one embodiment, a multi-turn analog potentiometer can be used as multi-turn readout potentiometer 56. The analog output of the potentiometer can be coupled to an analog-to-digital converter (not shown in this figure) in a known manner to produce a digital output signal. Alternatively, known optical arrangements, wiper-type potentiometers, or magnetic direct digital readout systems may be provided for producing the paper stack thickness information. However, multi-turn coupling is preferred since it provides better accuracy at low cost.

FIG. 4 is a simplified isometric representation of an adjustable platen mounting. After the paper stock thickness has been determined, illustratively in accordance with the system of FIGS. 1 and 2, the printing parameters may be adjusted for optimum printing clarity. The distance between a ribbon 77, which may be an impact printing ribbon, and a platen printing center line 71 of a cylindrical platen 70 is known as the "throat measurement," which corresponds to a throat opening distance 76. Paper stock which is to be printed, such as paper sheet 31 or envelope 32, must pass through throat opening distance 76. The paper stock is held to cylindrical platen 70 during printing, and it is important to regulate the impact strike distance of a character pad located on an impact print disk 78. During printing, the impact force is supplied to a selected character pad and is transmitted through impact printing ribbon 77 so as to impress the ink of the ribbon onto the paper stock. An impact hammer (not shown) causes the character pad of impact print disk 78 to move toward the paper to be printed, in accordance with the requirements of a particular strike path geometry.

As will be discussed hereinbelow with respect to FIG. 6, the hammer energy may be changed in response to the thickness of the paper. However, the specification of hammer energy must assume that the forwardmost surface of the paper stock is at a known point on the strike path for optimum release of energy. Moreover, a damper ring and pad spoke of the impact printed disk contribute a variable resistance force over the travel path of the character pad after a hammer impact.

FIG. 4 is a simplified isometric representation of an illustrative mechanism for adjusting the position of a platen in response to the thickness of paper to be printed upon. A reversible motor 88 is provided with a front threaded shaft 89 which is threadedly engaged with a platen frame nut 82. Platen frame nut 82 moves forward or back, along front threaded shaft 89, in response to the direction of rotation of motor 88. Since the platen frame nut is mechanically coupled to a platen adjustment frame 79, this frame also moves as the platen frame nut moves. A platen 70 is provided with a pair of platen shafts 72A and 72B which are arranged axially on respective ends thereof. Platen shafts 72A and 72B are rotatively engaged with respective platen shaft bearings 73A and 73B. In this arrangement, platen 70 is constrained to move only in a horizontal plane to an extent which is limited by the sliding communication of platen adjustement frame 79 through a pair of platen frame slideways 80A and 80B. The platen frame slideways are connected to the frame (not shown) of the printer, or some other point of reference. In addition, platen 70 may be moVed only in a direction which is parallel to the printing path impact of an printed disk 78 because platen adjustment frame 79 is constrained along its path of travel by a left pantograph leg pair 84 and a right pantograph leg pair 83. The left and right pantograph leg pairs are each pivotally coupled to a rear motor bar 85 which is coupled to the printer frame by respective left and right frame mount 86 and 87.

A rear motor shaft 90 is connected to a throat potentiometer shaft 93 by a shaft coupler 92, such that as the reversible small motor turns, a throat potentiometer 94, which may be of a ten-turn, high accuracy type, is also turned. Since reversible small motor 88 directly determines the throat opening distance 76, the electrical resistance of the potentiometer is directly related to the opening width. It is to be understood that the ten-turn potentiometer used in this illustrative embodiment exemplifies a high-accuracy, moderate cost position feedback device, and that other feedback devices, such as linear potentiometers linear transformers, direct digitizing wipers, or magnets moving near Hall Effect transducers, may also be used.

FIGS. 5A to 5E illustrate various structural details of a printer strike bar embodiment having a variable impact hardness characteristic. A pile 97 is provided with a plurality of very long and thin fibers of glass or metal which are secured to a pile base 96. The pile base may be formed of woven fabric with an adhesive which improves fiber retention. In a preferred embodiment, the pile base is flexible so that it can assume various positions. The specialized long pile of fibers on the flexible base has a length of nearly one inch in one embodiment. The fibers may be made of fiberglass, brass, or stainless steel, such as produced by Schlegel Corporation, Jefferson Road, Henrietta, N.Y. Of course, a variety of other fiber materials can be used. Generally, such pile fabrications are used for thermal insulation or radio-frequency isolation. However, specialized construction of the type discussed herein is not uncommon.

FIG. 5B shows pile base 96 formed into a concave pile such that the pile fibers form a tight array. The pile fibers are brought more closely together when a pile line $A_1-A_2$ is curved, as in FIG. 5B, as opposed to when line $A_1-A_2$ is straight, as in FIG. 5A. A catalyzing resin, such as Epoxy type 60, which is available from Ren Plastics, Lansing, Mich., may be added to the tight fiber array of FIG. 5B. Such a resin is partially glass-filled and has a very low viscosity so as to permit a complete filling of the interstitial spaces between the fibers. In this manner, a composite structure is created combining the epoxy resin and the pile fibers, in a permanent configuration. The fiber end of the structure can be ground to a radius which approximates that of a cylindrical platen to be replaced, illustratively on the order of 11/16 of an inch. Subsequently, a pile backing 95 may be affixed to pile base 96. A suitable backing material for such a pile backing would be sheet brass, illustratively 0.015 inch thick, again utilizing an epoxy resin adhesive. In this manner, a printing impact would strike striker face 98, and the impact would be transferred by the resin-pile fiber array to the rear most surface, pile backing 95, which is constructed to have an area which is several times that of striker face 98. The impact resistance of strike face 98, which is related to its hardness, is controlled by placing pile backing 95 over a curved striker base 100. Striker base 100 can be a soft elastomer, such as rubber of low durometer value, or a synthetic blend rubber of medium durometer value. Both such materials are manufactured to specification by such vendors as Ames Rubber Company, New York, N.Y. For a very hard strike characteristic, a lamination of brass strips and lead may be used, wherein the brass strips contain the lead strips so that the lead does not extrude away from the desired laminar construction over a long period of use. Since the impact energy is not distributed over a large area, the absorption of impact energy per unit area is fairly low by comparison to the local deformation in a conventional platen wherein high local energy absorption of a printing impact is achieved by a rubber platen having a cylindrical shell over an aluminum core.

FIGS. 5D and 5E show a variety of striker bar ensembles 99 placed on a single platen shape. In a preferred embodiment, each striker base 100 of a separate striker bar ensemble 99 may have a different resiliency characteristic, which may range between soft to very hard. In FIG. 5E, four such striker bars are placed in one cylindrical platen member. In a preferred use of such an embodiment, the cylindrical striker bar would rotate upward in stepwise fashion with the paper, as the paper is stepped to the next line of print. Then, as the paper is held in that position, the striker bar cylinder would rotate downward to the printing reference centerline position and impact printing would begin.

FIG. 6 is a function block diagram of an information control system constructed in accordance with the principles of the invention. Since almost all printers and most typewriters now utilize a microprocessor for data and control information processing power it would not be unduly expensive to utilize a microprocessor 107 as the heart of the paper thickness measurement and response system. Microprocessor 107 may provide a variety of other functions since only a very small fraction of the overall processor capability is required to perform the paper thickness measurement and response functions. The residual capacity of the microprocessor can be used for the remaining data and control functions.

As shown in the upper left portion of FIG. 6, information to the microprocessor is provided from a plurality of gauging system data source units, which, in this embodiment, include paper gauge potentiometer 65 and bin gauge potentiometers 56A, 56B, and 56C. The intermittent nature of the data flow allows a selector switch 105 to select only one data input source at a time and route that information, in the form of a low voltage analog signal, to an analog-digital converter 106. Analog-digital converter 106 provides at its output a coded signal which is suitable for processing by micro-processor 107.

The data feedback signal from throat distance potentiometer 94 is also conducted through selected switch 105 to be converted by the analog-digital converter to the coded form processable by microprocessor 107. When the paper thickness is changed, as observed in the data from paper gauge 65, or stored to represent paper stock thickness in sheet bins 22A, 22B, and 22C, the microprocessor produces driver input commands to a motor driver 108.

A high power amplifier chip (not shown) conducts the control signals to the windings of the throat adjustment motor, illustratively reversible small motor 88 discussed above, so as to change throat distance 76. The paper thickness information can also be used to modify standard hammer intensity signals. The hammer intensity signals can be determined from a read-only memory chip 109 (not specifically shown), and after modification by a tabular arithmetic processing in microprocessor 107, a modified hammer intensity signal 110 is delivered to the hammer driver amplifier.

FIG. 7 is a simplified isometric representation of a paper edge sensor system. After the printer has been adjusted to ensure passage of a paper sheet 31 through throat distance 76 by measurement of the paper thickness, it is required that the location of the paper edges be determined. The relative vertical positions of the left and right ends of the top edge of paper sheet 31 must be determined to ensure that sheet paper 31 is placed so as to print horizontal lines which are parallel to the top edge of the paper. Although sheet paper 31 is fed to the printer so as to be essentially properly oriented, if any paper alignment is required to register the top edge thereof with a horizontal reference line, the paper edge position may be changed. Left edge measurement can be performed with a series of stationary optical sensors, or a stationary sensor which scans horizontally. These arrangements, however, tend to be expensive both in initial cost and in maintenance.

It is known to place an optical sensor on the horizontally moving print carriage, such as print carriage 13 of FIG. 7, which utilizes the optical reflectance of sheet paper 31 in comparison to a backing sheet (not shown) which is usually made with a flat black, highly non-reflective surface. Such a differential optical reflectance system works well in situations where sheet paper 31 is a light, moderately reflective surface, such as white bond paper. However, when sheet paper 31 or envelope 32 is provided with a dark, roughened ended surface, such as the deep warm brown paper used with a light color ink for highly noticeable letters, which is currently used by artistic firms such as decorators, the optical reflectance difference between the backing sheet and the paper sheet may be low. The paper edge sensor usually requires a minimum differential, illustratively 0.2 density units, to function properly. Such a differential observable density may not be available in certain situations.

FIG. 6 shows an embodiment of the invention which utilizes a sensor module 116 which maybe placed on the underside of print carriage 113, immediately rearward of a linear bearing 114A which travels along a rear support shaft 115A to guide print carriage 113 in a lateral path. The illuminator-sensor module contains an illuminating lamp 117 in a housing with a front lens 127 to give a focused illumination pattern, such as illumination pattern 120. A sensor unit 122 is mounted in a sensor housing 119 with a frontal lens 126 so as to provide a sensor pickup pattern 121. In embodiments where illuminator-sensor module 116 is mounted on print carriage 113 and travels laterally therewith, the module will thus pass sheet paper 31 with a paper edge 131. A special backing sheet, in the form of a florescent strip 123, is provided immediately behind the plane of sheet paper 31.

In the simplified schematic illustration of FIG. 8, illuminator-sensor module 116 is shown with paper sheet 31 drawn separated from florescent strip 123 for the sake of clarity. Normally, however, these two members are virtually in contact with each other. Illuminating lamp 117 produces much of its output in the near ultraviolet, preferably in the 3800° to 4,000° wave length region. A filter 118 is provided to exclude optical energy outside of the predetermined wave length range. A front lens 127 focusses the entitled light into a nearly parallel beam, thereby forming an illumination exciting waveband 128, as shown. The radiation in this exciting waveband 128 impinges upon sheet paper 31, thereby illuminating edge 31 of the paper. Most of sheet paper 31 is quite absorptive in exciting waveband 128, except for some known drafting papers which are used for blueprint master sheets. Thus, exciting wave ban 128 is blocked by sheet paper 31 to its edge 131.

In FIG. 7, the balance of exciting waveband 128 is shown to fall on fluorescent strip 123. Fluorescent strip 123 is coated with a waveband conversion paint, illustratively of a type originated by DayGlo Paint Corporation, Cleveland, Ohio. This paint has the property of absorbing shorter wave length light and emitting longer wave length light. A wide selection of fluorescent paint is available and the paint used should emit a response color that is well away from the exciting waveband. A suitable selection of paint color would be red-orange, which is strongly excited by exciting waveband 128, and emits a fluorescent waveband 129, illustratively, in the red-orange region. Thus, sensor unit 122 may be tuned, such as by a combination of natural response peak and a sensor filter 125, so as to be strongly responsive to optical energy in fluorescent waveband.

Since sheet paper 31 is actually in virtual contact with fluorescent strip 123, any fluorescent energy in waveband 129 which results from passage of light in exciting waveband 128 through the sheet paper to the fluorescent strip will be almost entirely absorbed by the paper sheet. Thus, the boundary represented by paper edge 131 will be a very bright fluorescent waveband 129 at the exposed portion of fluorescent strip 123. This very brightly emitting edge will thus be strongly received by filter sensor unit 122, and the resulting edge position indication signal which is produced as print carriage 113 traverses horizontally past paper edge 131 will be very precise. This precise edge data allows dynamic setting of the printing boundary or margin. Since most printers use a horizontal increment of 1/120th of an inch, the sharp edge differential will provide the required resolution, even for dark colored paper. This allows the left margin to be set with respect to the discovered left edge of the paper after horizontal alignment of the top edge has been achieved.

If paper having a non-rectangular shape is to be printed upon, it will not be possible to set and lock the margin and memory. Occasionally, such printings are used for special emphasis or other creative purposes. Such variable edges require frequent rescan of the left edge to set the margin anew for each printing line. If the right edge is also varying, as when the document is not rectangular in shape, the right edge will also have to be monitored. If the application for printing on special shapes of paper arises often, it is then preferable to mount a sensor illuminator pair, such as sensor illuminator module 116 of FIG. 6 on both left most and right most rear edges of print carriage 113. Thus, the dual sensor position will determine the location of the left and right edges more quickly than if only one set of position were used. Moreover, print carriage 113 will be required to move shorter distances to bring either rightmost or leftmost module 116 over a paper boundary.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention, and should not be construed to limit the scope thereof.

What is claimed is:

1. A sheet material sensor system comprising:
   illuminator means for producing a beam of optical energy at a first frequency, said illuminator means being arranged to direct said beam of optical energy toward a first side of the sheet material;
   photo-receiver means for producing an output signal and responsive to optical energy received at a second frequency, said photo-receiver means being arranged on said first side of the sheet material; and
   light converter means arranged on a second side of the sheet material for converting said beam of optical radiation at said first frequency impinging thereon to a reflected beam of optical radiation at said second frequency.

2. The sheet material sensor system of claim 1 wherein said illuminator means comprises:
   source means for emitting said optical radiation at said first frequency;
   filter means for propagating optical radiation for said source means in a predetermined range of frequencies in the vicinity of said first frequency; and
   lens means for forming a beam of said optical radiation.

3. The sheet material sensor system of claim 1 wherein said photo receiver means comprises:
   focusing lens means for converging received optical radiation;
   sensor filter means for transmitting optical radiation in a predetermined range of frequencies in the vicinity of said second frequency; and
   a sensor element for producing a signal responsive to said optical radiation in said predetermined range of frequencies in the vicinity of said second frequency.

4. The sheet material sensor system of claim 1 wherein said light convertor means comprises a fluorescing paint layer arranged on the upper side of the sheet material from said illuminator means and said photo receiver means.

5. A sheet material sensor system comprising:
   illuminator means for producing a beam of optical energy at a first frequency, said illuminator means being arranged to direct said beam of optical energy toward a first portion of the sheet material;
   photo-receiver means for producing an output signal and responsive to optical energy received at a second frequency, said photo-receiver means begin arranged adjacent said first portion of the sheet material; and
   light converter means arranged adjacent a second portion of the sheet material for converting said beam of optical radiation at said first frequency impinging thereon to reflected beam of optical radiation at said second frequency.

6. A sheet material sensor system comprising:
   illuminator means for producing a beam of optical energy at a first frequency, said illuminator means being arranged to direct said beam of optical energy toward a side of the sheet material;
   photo-receiver means for producing an output signal and responsive to optical energy received at a second frequency, said photo-receiver means being arranged adjacent said side of the sheet material; and
   light converter means arranged so that it is selectively covered by a portion of the sheet material for converting said beam of optical radiation at said first frequency impinging on an uncovered surface thereof to a reflected beam of optical radiation at said second frequency.

* * * * *